United States Patent
Vinjamuri et al.

(10) Patent No.: US 7,739,385 B1
(45) Date of Patent: Jun. 15, 2010

(54) EXPLICIT LOCKING OF RESOURCES IN DEVICES ACCESSIBLE ON A NETWORK

(75) Inventors: Madan Mohan Vinjamuri, Bangalore (IN); Bachhus S. Amarnath, Bangalore (IN); Ranjiith Selvarajan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1191 days.

(21) Appl. No.: 10/461,425

(22) Filed: Jun. 16, 2003

(51) Int. Cl.
G06F 15/173 (2006.01)
G06F 15/16 (2006.01)

(52) U.S. Cl. ...................... 709/226; 709/229
(58) Field of Classification Search ............... 709/226, 709/229
See application file for complete search history.

(56) References Cited

U.S. PATENT DOCUMENTS

| | | | |
|---|---|---|---|
| 5,287,501 A * | 2/1994 | Lomet | 707/202 |
| 5,526,524 A * | 6/1996 | Madduri | 710/200 |
| 5,764,976 A * | 6/1998 | Hsiao | 707/8 |
| 5,872,981 A * | 2/1999 | Waddington et al. | 710/200 |
| 6,105,085 A * | 8/2000 | Farley | 710/41 |
| 6,119,156 A * | 9/2000 | Filion et al. | 709/220 |
| 6,219,708 B1 * | 4/2001 | Martenson | 709/226 |
| 6,304,938 B1 * | 10/2001 | Srivastava | 710/200 |
| 6,310,859 B1 * | 10/2001 | Morita et al. | 370/235 |
| 6,343,339 B1 * | 1/2002 | Daynes | 710/200 |
| 6,404,743 B1 * | 6/2002 | Meandzija | 370/254 |
| 6,412,034 B1 * | 6/2002 | Chan | 710/200 |
| 6,499,031 B1 * | 12/2002 | Hopmann et al. | 707/8 |
| 6,584,489 B1 * | 6/2003 | Jones et al. | 718/104 |
| 6,643,258 B1 * | 11/2003 | Ise et al. | 370/230 |
| 6,708,198 B1 * | 3/2004 | Simmons et al. | 718/104 |
| 6,807,540 B2 * | 10/2004 | Huras et al. | 707/8 |
| 6,829,609 B1 * | 12/2004 | Wagner | 707/8 |
| 6,920,454 B1 * | 7/2005 | Chan | 707/8 |
| 7,028,300 B2 * | 4/2006 | Goldick | 718/104 |
| 7,047,299 B1 * | 5/2006 | Curtis | 709/225 |
| 7,051,106 B2 * | 5/2006 | Grobler et al. | 709/228 |
| 7,065,042 B1 * | 6/2006 | Pan et al. | 370/229 |
| 7,099,974 B2 * | 8/2006 | Hsu et al. | 710/240 |
| 7,107,267 B2 * | 9/2006 | Taylor | 707/8 |
| 7,228,545 B2 * | 6/2007 | Circenis et al. | 718/102 |
| 7,233,946 B1 * | 6/2007 | McPolin | 707/8 |
| 7,240,364 B1 * | 7/2007 | Branscomb et al. | 726/9 |
| 7,281,035 B2 * | 10/2007 | Ihara et al. | 709/219 |
| 7,352,692 B1 * | 4/2008 | Saleh et al. | 370/216 |
| 7,406,519 B2 * | 7/2008 | Goldick | 709/225 |

(Continued)

OTHER PUBLICATIONS

Levi & Schoenwalder; Entitled, "Request for Comments: 3231- Definitions of Managed Objects for Scheduling Management Operations"; Jan. 2002; Available from www.ietf.org (29 Pages).

*Primary Examiner*—William C Vaughn, Jr.
*Assistant Examiner*—Kristie D Shingles
(74) *Attorney, Agent, or Firm*—Patent Capital Group

(57) ABSTRACT

An agent locking a resource in a device in response to receiving an explicit request to lock the resource. Once in a locked state, access to entities (applications, devices, etc.) other than a owner of the lock may be restricted (e.g., no access, only read access, etc.). The agent unlocks the resource in response to an unlock request or if keep-alive messages are not received for a long duration.

31 Claims, 21 Drawing Sheets

U.S. PATENT DOCUMENTS

| | | | |
|---|---|---|---|
| 7,411,977 B1* | 8/2008 | Chen et al. | 370/468 |
| 2002/0087366 A1* | 7/2002 | Collier et al. | 705/5 |
| 2003/0005130 A1* | 1/2003 | Cheng | 709/228 |
| 2004/0039970 A1* | 2/2004 | Barnard et al. | 714/43 |
| 2004/0117372 A1* | 6/2004 | Kasman | 707/9 |
| 2006/0242644 A1* | 10/2006 | Blue | 718/100 |

* cited by examiner

```
4001    CISCO-LOCK-MIB DEFINITIONS ::= BEGIN
4002
4003    IMPORTS
4004        MODULE-IDENTITY, OBJECT-TYPE, NOTIFICATION-TYPE,
4005        Integer32, Unsigned32, Counter32, mib-2
4006            FROM SNMPv2-SMI
4007
4008        TEXTUAL-CONVENTION,
4009        DateAndTime, RowStatus, StorageType, VariablePointer
4010            FROM SNMPv2-TC
4011
4012        MODULE-COMPLIANCE, OBJECT-GROUP, NOTIFICATION-GROUP
4013            FROM SNMPv2-CONF
4014
4015        SnmpAdminString
4016            FROM SNMP-FRAMEWORK-MIB;
4017
4018            ciscoMgmt
4019              FROM CISCO-SMI;
4020
4021    lockMIB MODULE-IDENTITY
4022        LAST-UPDATED ""
4023        ORGANIZATION ""
4024        CONTACT-INFO
4025          " "
4026        DESCRIPTION
4027          " "
4028        ::= { ciscoMgmt 200 }
4029
4030    --
4031    -- The various groups defined within this MIB definition:
4032    --
4033    lockObjects      OBJECT IDENTIFIER ::= { lockMIB 1 }
4034    lockNotifications OBJECT IDENTIFIER ::= { lockMIB 2 }
4035    lockConformance   OBJECT IDENTIFIER ::= { lockMIB 3 }
```

*FIG. 4A*

| | |
|---|---|
| 4040 | -- Textual Conventions: |
| 4041 | SnmpPduErrorStatus ::= TEXTUAL-CONVENTION |
| 4042 | STATUS    current |
| 4043 | DESCRIPTION |
| 4044 | " " |
| 4045 | SYNTAX    INTEGER { |
| 4046 |     noResponse(-1), |
| 4047 |     noError(0), |
| 4048 |     tooBig(1), |
| 4049 |     noSuchName(2), |
| 4050 |     badValue(3), |
| 4051 |     readOnly(4), |
| 4052 |     genErr(5), |
| 4053 |     noAccess(6), |
| 4054 |     wrongType(7), |
| 4055 |     wrongLength(8), |
| 4056 |     wrongEncoding(9), |
| 4057 |     wrongValue(10), |
| 4058 |     noCreation(11), |
| 4059 |     inconsistentValue(12), |
| 4060 |     resourceUnavailable(13), |
| 4061 |     commitFailed(14), |
| 4062 |     undoFailed(15), |
| 4063 |     authorizationError(16), |
| 4064 |     notWritable(17), |
| 4065 |     inconsistentName(18) |
| 4066 | } |

*FIG. 4B*

```
4080        -- Some scalars which provide information about the local time
4081        -- zone.
4082        --
4083
4084        lockLocalTime OBJECT-TYPE
4085            SYNTAX    DateAndTime (SIZE (11))
4086            MAX-ACCESS  read-only
4087            STATUS    current
4088            DESCRIPTION
4089                " "
4090            ::= { lockObjects 1 }
4091
4092        lockKeepAlive OBJECT-TYPE
4093            SYNTAX    SnmpAdminString (SIZE (0..97))
4094            MAX-ACCESS
4095            STATUS    current
4096            DESCRIPTION
4097                " "
4098            ::= { lockObjects 2 }
4099
4100
4101        --
4102        -- The lock table which controls the resource-locker.
4103        --
4104
4105        lockTable OBJECT-TYPE
4106            SYNTAX    SEQUENCE OF LockEntry
4107            MAX-ACCESS  not-accessible
4108            STATUS    current
4109            DESCRIPTION
4110                " "
4111            ::= { lockObjects 3 }
```

*FIG. 4C*

```
4130    lockEntry OBJECT-TYPE
4131        SYNTAX    LockEntry
4132        MAX-ACCESS    not-accessible
4133        STATUS    current
4134        DESCRIPTION
4135            " "
4136        INDEX { lockOwner, lockName }
4137        ::= { lockTable 1 }
4138
4139    LockEntry ::= SEQUENCE {
4140        lockOwner        SnmpAdminString,
4141        lockName         SnmpAdminString,
4142        lockDescr        SnmpAdminString,
4143        lockInterval     Unsigned32,
4144        lockWeekDay      BITS,
4145        lockMonth        BITS,
4146        lockDay          BITS,
4147        lockHour         BITS,
4148        lockMinute       BITS,
4149        lockType         INTEGER,
4150        lockContextName  SnmpAdminString,
4151        lockVariable     VariablePointer,
4152        lockKey          SnmpAdminString,
4153            lockMaxDuration        Unsigned32,
4154            lockActualDuration     Unsigned32,
4155            lockRequestTime        DateAndTime,
4156            lockLastActiveTime     DateAndTime,
4157        lockOperStatus   INTEGER,
4158        lockOper    INTEGER,
4159        lockRowStatus    RowStatus
4160    }
4161
4162    lockOwner OBJECT-TYPE
4163        SYNTAX    SnmpAdminString (SIZE(0..32))
4164        MAX-ACCESS    not-accessible
4165        STATUS    current
4166        DESCRIPTION
4167            " "
4168        ::= { lockEntry 1 }
```

*FIG. 4D*

```
4180    lockName OBJECT-TYPE
4181        SYNTAX    SnmpAdminString (SIZE(1..32))
4182        MAX-ACCESS  not-accessible
4183        STATUS    current
4184        DESCRIPTION
4185          " "
4186        ::= { lockEntry 2 }
4187
4188    lockDescr OBJECT-TYPE
4189        SYNTAX    SnmpAdminString
4190        MAX-ACCESS  read-create
4191        STATUS    current
4192        DESCRIPTION
4193          " "
4194        DEFVAL { "H }
4195        ::= { lockEntry 3 }
4196
4197    lockInterval OBJECT-TYPE
4198        SYNTAX    Unsigned32
4199        UNITS     "seconds"
4200        MAX-ACCESS  read-create
4201        STATUS    current
4202        DESCRIPTION
4203          " "
4204        DEFVAL { 0 }
4205        ::= { lockEntry 4 }
```

*FIG. 4E*

| | |
|---|---|
| 4230 | lockWeekDay OBJECT-TYPE |
| 4231 |     SYNTAX    BITS { |
| 4232 |         sunday(0), |
| 4233 |         monday(1), |
| 4234 |         tuesday(2), |
| 4235 |         wednesday(3), |
| 4236 |         thursday(4), |
| 4237 |         friday(5), |
| 4238 |         saturday(6) |
| 4239 |     } |
| 4240 |     MAX-ACCESS  read-create |
| 4241 |     STATUS    current |
| 4242 |     DESCRIPTION |
| 4243 |         " " |
| 4244 |     DEFVAL { {} } |
| 4245 |     ::= { lockEntry 5 } |
| 4246 | |
| 4247 | lockMonth OBJECT-TYPE |
| 4248 |     SYNTAX    BITS { |
| 4249 |         january(0), |
| 4250 |         february(1), |
| 4251 |         march(2), |
| 4252 |         april(3), |
| 4253 |         may(4), |
| 4254 |         june(5), |
| 4255 |         july(6), |
| 4256 |         august(7), |
| 4257 |         september(8), |
| 4258 |         october(9), |
| 4259 |         november(10), |
| 4260 |         december(11) |
| 4261 |     } |
| 4262 |     MAX-ACCESS  read-create |
| 4263 |     STATUS    current |

*FIG. 4F*

```
4280            DESCRIPTION
4281                " "
4282            DEFVAL { {} }
4283            ::= { lockEntry 6 }
4284
4285        lockDay OBJECT-TYPE
4286            SYNTAX    BITS {
4287                    d1(0), d2(1), d3(2), d4(3), d5(4),
4288                    d6(5), d7(6), d8(7), d9(8), d10(9),
4289                    d11(10), d12(11), d13(12), d14(13), d15(14),
4290                    d16(15), d17(16), d18(17), d19(18), d20(19),
4291                    d21(20), d22(21), d23(22), d24(23), d25(24),
4292                    d26(25), d27(26), d28(27), d29(28), d30(29),
4293                    d31(30),
4294                    r1(31), r2(32), r3(33), r4(34), r5(35),
4295                    r6(36), r7(37), r8(38), r9(39), r10(40),
4296                    r11(41), r12(42), r13(43), r14(44), r15(45),
4297                    r16(46), r17(47), r18(48), r19(49), r20(50),
4298                    r21(51), r22(52), r23(53), r24(54), r25(55),
4299                    r26(56), r27(57), r28(58), r29(59), r30(60),
4300                    r31(61)
4301                }
4302
4303            MAX-ACCESS  read-create
4304            STATUS    current
4305            DESCRIPTION
4306                " "
4307
4308            DEFVAL { {} }
4309            ::= { lockEntry 7 }
```

*FIG. 4G*

| | |
|---|---|
| 4330 | lockHour OBJECT-TYPE |
| 4331 |    SYNTAX   BITS { |
| 4332 |         h0(0), h1(1), h2(2), h3(3), h4(4), |
| 4333 |         h5(5), h6(6), h7(7), h8(8), h9(9), |
| 4334 |         h10(10), h11(11), h12(12), h13(13), h14(14), |
| 4335 |         h15(15), h16(16), h17(17), h18(18), h19(19), |
| 4336 |         h20(20), h21(21), h22(22), h23(23) |
| 4337 |    } |
| 4338 |    MAX-ACCESS  read-create |
| 4339 |    STATUS   current |
| 4340 |    DESCRIPTION |
| 4341 |      " " |
| 4342 |    DEFVAL { {} } |
| 4343 |    ::= { lockEntry 8 } |

*FIG. 4H*

```
4370    lockMinute OBJECT-TYPE
4371        SYNTAX    BITS {
4372            m0(0),  m1(1),  m2(2),  m3(3),  m4(4),
4373            m5(5),  m6(6),  m7(7),  m8(8),  m9(9),
4374            m10(10), m11(11), m12(12), m13(13), m14(14),
4375            m15(15), m16(16), m17(17), m18(18), m19(19),
4376            m20(20), m21(21), m22(22), m23(23), m24(24),
4377            m25(25), m26(26), m27(27), m28(28), m29(29),
4378            m30(30), m31(31), m32(32), m33(33), m34(34),
4379            m35(35), m36(36), m37(37), m38(38), m39(39),
4380            m40(40), m41(41), m42(42), m43(43), m44(44),
4381            m45(45), m46(46), m47(47), m48(48), m49(49),
4382            m50(50), m51(51), m52(52), m53(53), m54(54),
4383            m55(55), m56(56), m57(57), m58(58), m59(59)
4384        }
4385        MAX-ACCESS  read-create
4386        STATUS    current
4387        DESCRIPTION
4388            "The set of minutes within an hour when the scheduled action
4389             should take place."
4390        DEFVAL { {} }
4391        ::= { lockEntry 9 }
4392
4393    lockType OBJECT-TYPE
4394        SYNTAX    INTEGER {
4395            periodic(1),
4396            calendar(2),
4397            oneshot(3)
4398        }
4399        MAX-ACCESS  read-write
4400        STATUS    current
4401        DESCRIPTION
4402            "."
4403        DEFVAL { periodic }
4404        ::= { lockEntry 10 }
```

*FIG. 4I*

```
4420    lockContextName OBJECT-TYPE
4421        SYNTAX    SnmpAdminString (SIZE(0..32))
4422        MAX-ACCESS  read-create
4423        STATUS    current
4424        DESCRIPTION
4425            " "
4426        ::= { lockEntry 11 }
4427
4428    lockVariable OBJECT-TYPE
4429        SYNTAX
4430        MAX-ACCESS  read-create
4431        STATUS    current
4432        DESCRIPTION
4433            " "
4434
4435        ::= { lockEntry 12 }
```

*FIG. 4J*

```
lockKey OBJECT-TYPE
    SYNTAX    SnmpAdminString (SIZE(0..31))
    MAX-ACCESS  write-only
    STATUS    current
    DESCRIPTION
        " "
    ::= { lockEntry 13 } lockMaxDuration OBJECT-TYPE
    SYNTAX    Unsigned32
    UNITS     "seconds"
    MAX-ACCESS  read-create
    STATUS    current
    DESCRIPTION
        " "
    DEFVAL { 0 }
    ::= { lockEntry 14 } lockActualDuration OBJECT-TYPE
    SYNTAX    Unsigned32
    UNITS     "seconds"
    MAX-ACCESS  read-only
    STATUS    current
    DESCRIPTION
        " "

::= { lockEntry 15 } lockRequestTime OBJECT-TYPE
    SYNTAX    DateAndTime
    MAX-ACCESS  read-only
    STATUS    current
    DESCRIPTION
        " "
    DEFVAL { '0000000000000000'H }
    ::= { lockEntry 16 }
```

*FIG. 4K*

```
4520        lockLastActiveTime OBJECT-TYPE
4521            SYNTAX    DateAndTime
4522            MAX-ACCESS  read-only
4523            STATUS    current
4524            DESCRIPTION
4525                " "
4526            DEFVAL { '0000000000000000'H }
4527            ::= { lockEntry 17 }
4528
4529
4530        lockOperStatus OBJECT-TYPE
4531            SYNTAX    INTEGER {
4532
4533                        scheduled(1),
4534                        conflict(2)
4535                    locked(3),
4536                        --unlocked(4),
4537                        cancelled(5),
4538                        finished(6)
4539                }
4540            MAX-ACCESS  read-only
4541            STATUS    current
4542            DESCRIPTION
4543                " "
4544            ::= { lockEntry 18 }
4545        lockOper OBJECT-TYPE
4546            SYNTAX    INTEGER {
4547                    lock(1),
4548                    unlock(2),
4549                        cancel(3)
4550                }
4551
4552            MAX-ACCESS  read-write
4553            STATUS    current
4554            DESCRIPTION
4555                " "
4556            ::= { lockEntry 19 }
```

*FIG. 4L*

| | |
|---|---|
| 4570 | LockKeepAliveWarningsSent OBJECT-TYPE |
| 4571 | SYNTAX INTEGER |
| 4572 | MAX-ACCESS read-only |
| 4573 | STATUS current |
| 4574 | DESCRIPTION |
| 4575 | " " |
| 4576 | ::= { LockEntry 20 } |
| 4577 | |
| 4578 | lockRowStatus OBJECT-TYPE |
| 4579 | SYNTAX RowStatus |
| 4580 | MAX-ACCESS read-create |
| 4581 | STATUS current |
| 4582 | DESCRIPTION |
| 4583 | " " |
| 4584 | ::= { lockEntry 21 } |

*FIG. 4M*

```
lockTraps OBJECT IDENTIFIER ::= { schedNotifications 0 } lockActionLocked NOTIFICATION-TYPE
    OBJECTS    { lockResource, lockRequestTime, lockLastActiveTime,
       lockMaxDuration }
    STATUS    current
    DESCRIPTION
        " "

::= { lockTraps 1 } lockActionUnlocked NOTIFICATION-TYPE
    OBJECTS   { lockResource, lockActualDuration, lockMaxDuration }
    STATUS    current
    DESCRIPTION
        " "
    ::= { lockTraps 2 }

LockActionKeepAliveWarning NOTIFICATION-TYPE
    OBJECTS       { LockKeepAliveWarningsSent }
    STATUS current
    DESCRIPTION
        " "
    ::= {LockTraps 3 }

END.
```

*FIG. 4N*

EXPLICIT LOCKING OF RESOURCES IN DEVICES ACCESSIBLE ON A NETWORK

BACKGROUND OF THE INVENTION

1. Field of the Invention

The present invention relates to network management in communication networks, and more specifically to a method and apparatus for explicit locking of resources in a device accessible on a network.

2. Related Art

Networks are generally implemented to connect user devices (e.g., servers, personal computers). The connectivity enables implementation of various applications. For some of the applications, the network elements (e.g., routers, bridges, gateways) also operate as user devices. Thus, the word devices is generally used to refer to, among others, both user devices and network elements.

Devices generally contain several resources (e.g., routing table, passwords, SNMP community string, VPN configuration), and often need to be locked. Locking generally refers to prevention of access to at least some of the devices. As is well known, locking is often used associated with write operations (or modification in general), in which exclusive access is provided to a writing device at least until the writing operation (or modification) is complete.

Such locking feature may be necessary in devices accessible on a network as well. In one example scenario, an application in a network management station (NMS) may need to change the configuration (e.g., the routing table) of a device. At least during such configuration, it may be desirable to ensure that exclusive access of device (or routing table) is provided to the application. Accordingly, locking feature may be desirable in devices accessible on a network.

In one prior approach, a NMS maintains an internal table indicating the external resources which are to be locked, and an application may request a lock of a desired resource. A lock is granted to such a requesting application, and other applications executing in the NMS are denied access to the same resource while the table indicates that the resource is locked. As a result, at least the other applications in the NMS are denied access to the resource.

One problem with such an approach is that the lock indication in the NMS may not prevent applications in some other devices (e.g., another NMS) from accessing and modifying the same resource. As an environment may contain many NMSs, two applications in different NMSs may attempt to configure (modify) the same resource.

As would be readily appreciated, such modification attempts by multiple NMSs leads to absence of predictability in terms of expected end results (since the result may depend on which NMS modified last), in addition to potentially raising questions of integrity of the configuration of the resource.

BRIEF DESCRIPTION OF THE DRAWINGS

The present invention will be described with reference to the accompanying drawings, wherein:

FIGS. 4A-4N together contain the text defining a Management Information Base (MIB) which is used to implement explicit resource locking in an embodiment of the present invention.

In the drawings like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

According to an aspect of the present invention, an agent associated with a network accessible device receives an explicit locking request to lock a resource in the device from a requestor on a network. Access to the resource may then be restricted until the resource is unlocked. Thus, while the resource is in a lock state, exclusive access may be provided to an application (implemented on the requestor or elsewhere), thereby enabling reliable changes to the resource.

In one embodiment, the requester corresponds to a network management station (NMS), which is used to manage various devices in a network. The lock and unlock requests may be implemented using a Management Information Base (MIB) defined according to an aspect of the present invention. By using a MIB-based approach, locking and unlocking can be implemented using standard network management protocols such as simple network management protocol (SNMP), well known in the relevant arts.

According to another aspect of the present invention, an agent may receive keep-alive messages periodically while a resource is in a lock state. The keep-alive messages may indicate that the requestor (or other entity who is designed to unlock) is active and operational. Thus, if keep-alive messages are not received for a specified duration, the agent may forcibly unlock the resource. Warnings may be sent in the specified duration, indicating that non-reception of keep-alive messages can lead to forcibly unlocking the resource.

According to one more aspect of the present invention, an agent may receive requests which schedule locks for a future time. The agent may ensure that the locks are not scheduled in a conflicting way, for example, by multiple requesters (or NMSs). Thus, requesters may reliably schedule future lock requests.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
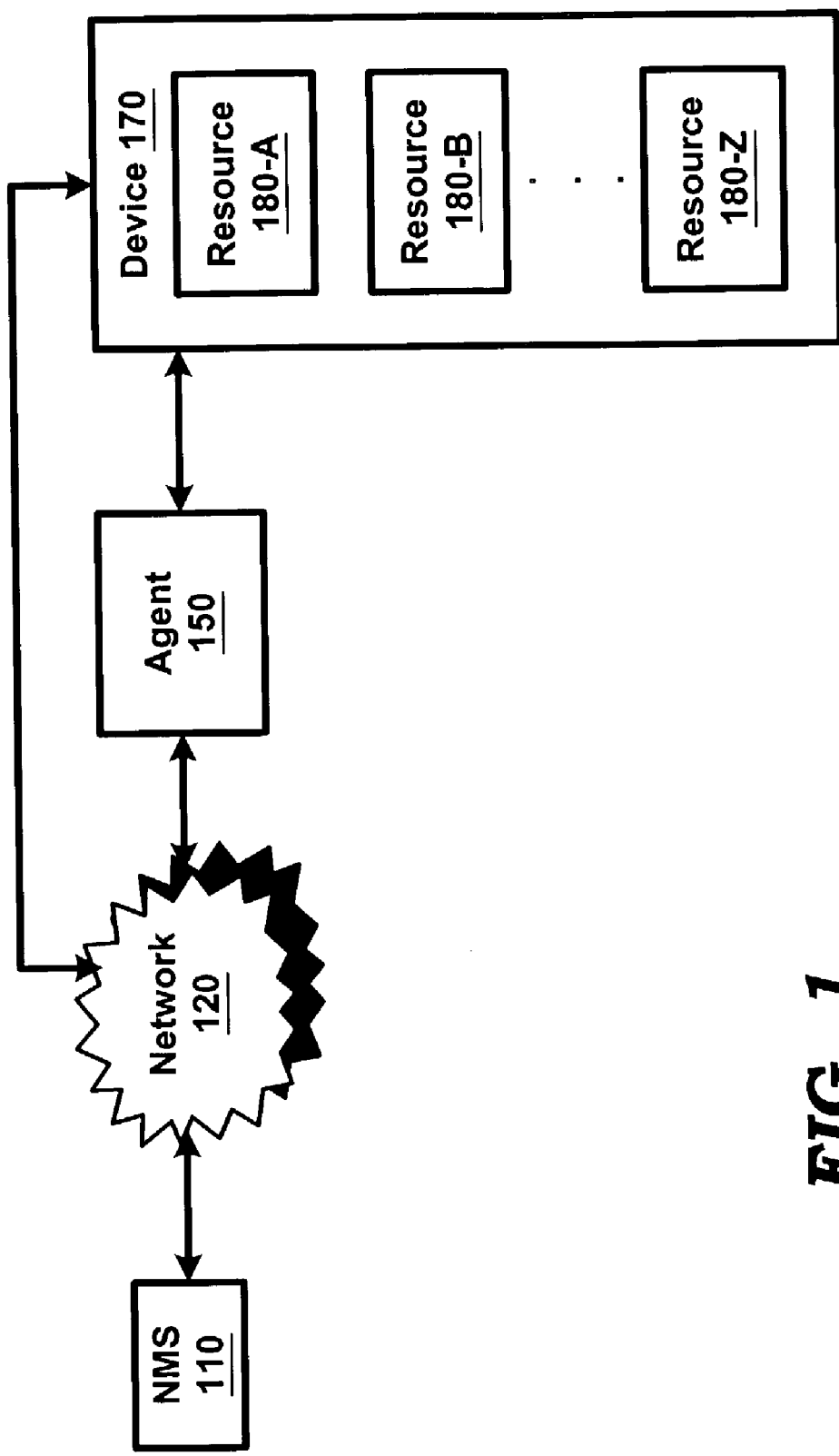
FIG. 1 is a block diagram illustrating an example environment in which the present invention can be implemented.

FIG. 1 is a block diagram illustrating an example environment in which the present invention can be implemented. The environment is shown containing NMS 110, network 120, agent 150 and device 170. Each system is described in further detail below.

The example environment is shown containing only representative systems for illustration. However, real-world environments typically contain many more resources and NMSs as will be apparent to one skilled in the relevant arts. Implementations in such environments are also contemplated to be within the scope and spirit of various aspects of the present invention.

Network 120 provides connectivity between various devices using an appropriate protocol (e.g., Internet Protocol). Thus, network 120 provides connectivity between NMS 110 and device 170. In general, network 120 contains network elements (e.g., routers), which may also be treated as resources with respect to locks provided according to various aspects of the present invention.

Device 170 represents an example device implemented according to an aspect of the present invention, and is shown containing resources 180-A to 180-Z. Resources 180-A through 180-Z represent examples of resources, associated with which locks are implemented according to various aspects of the present invention. In general, when a resource is in a locked state, access to the resource is restricted (e.g., only the owner of a lock can modify the resource, and others may have only read access).

NMS 110 may send requests to lock and unlock a resource (180-A through 180-Z) according to various aspects of the present invention. The requests may be used to schedule locking and unlocking at future time points, as well. In an embodiment described below, the requests are generated using a MIB and SNMP.

Agent 150 (along with possibly portions of device 170) implements locking and unlocking of resources 180-A to 180-Z in response to corresponding requests. Agent 150 may be implemented within device 170, and thus the two may be integrated in the form of a single unit. The description is continued with reference to the manner in which agent 150 and NMS 110 may operate to provide locks in example scenarios.

3. Operation of Agent

Figure 2A:
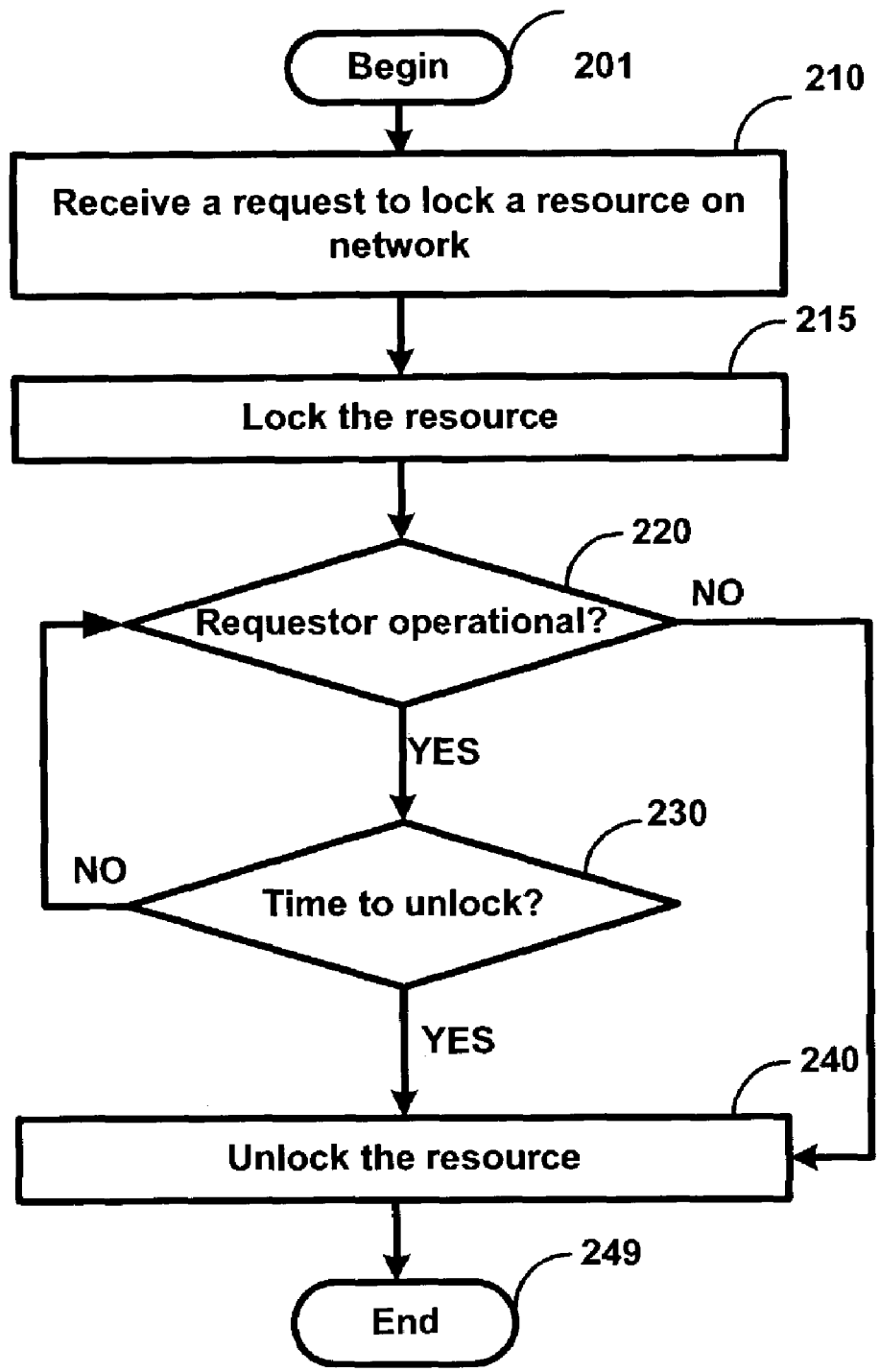
FIG. 2A is a flowchart illustrating a method using which an agent of the device enables locking of a resource according to an aspect of present invention.

FIG. 2A is a flowchart illustrating a method using which an agent enables locking of a resource according to an aspect of present invention. The flowchart is described with reference to FIG. 1 for illustration. However, the invention can be implemented in other environments without departing from various aspects of the present invention. The method begins in step 201, in which control immediately passes to step 210.

In step 210, agent 150 receives a request to lock a resource on network 120 from NMS 110 (a requester). The request may be received according to any convention. In an embodiment described below, a MIB is defined to provide a convention according to which requests may be specified.

In step 215, agent 150 locks the resource. Locking generally entails implementation of mechanism(s) to ensure that the resource is not accessed in an undesirable manner. For example, it may be desirable to only block write accesses (but not read accesses) during the locked duration. As another example, a different type of lock may prevent read accesses from a certain class/group of devices. In general, the blocking needs to be implemented to achieve a desired objective.

In step 220, agent 150 determines whether the requester (NMS 110) holding the lock is operational (including accessible) or not. Such a step may be performed to ensure that a resource is not locked indefinitely, for example, because the requester unexpectedly became non-operational without unlocking the resource. If the NMS 110 is operational, control is transferred to step 230, otherwise to step 240.

In step 230, agent 150 determines whether the time to unlock the resource is reached. Such a time may be deemed to be reached, for example, if an unlock request is received or if time to unlock has been scheduled earlier. Control passes to step 240 if the time to unlock is reached, or else control passes to step 220. Thus, the loop of steps 220 and 240 may be continued until either the requestor is determined to be non-operational or until a time to unlock is reached.

In step 240, agent 150 unlocks the resource. In general, the unlocking needs to be implemented consistent with the mechanism used to lock the resource. Once unlocked, the resource may be potentially used by any application. The method ends in step 249.

Thus, the flow-chart of FIG. 2A provides an example approach for implementing an agent to lock a resource in response to a request received on a network. The description is continued with reference to an example requestor (NMS 110), which may use such a lock feature.

4. Operation of NMS

Figure 2B:
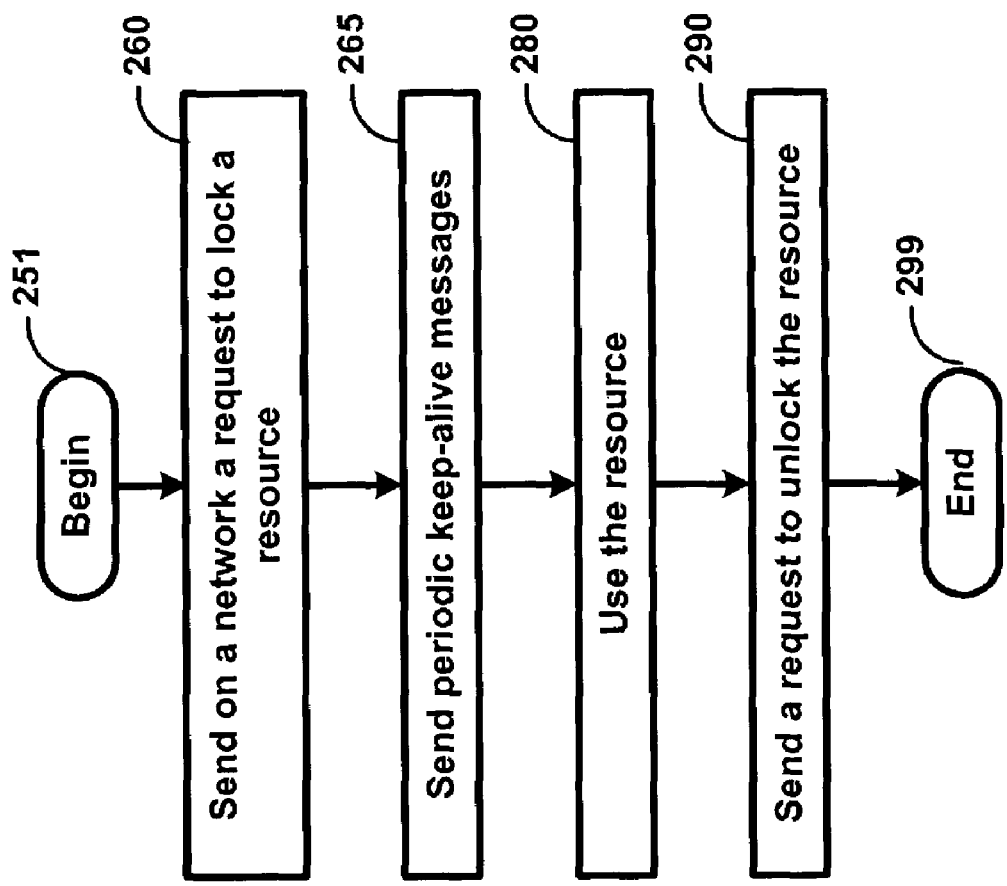
FIG. 2B is a flowchart illustrating a method using which a NMS locks a resource according to an aspect of present invention.

FIG. 2B is a flowchart illustrating the manner in which a requestor may implement a lock/unlock feature according to an aspect of the present invention. The flowchart is described with reference to NMS 110 for illustration. However, the invention can be implemented in other systems as well. The method begins in step 251, in which control immediately passes to step 260.

In step 260, NMS 110 may send a request on a network to lock a resource in device 170. The request may be sent according to any convention consistent with the implementation of agent 150.

In step 265, NMS 110 sends periodic keep-alive messages. The keep-alive messages may be used by agent 150 to determine (e.g., as in step 220 of FIG. 2A) that NMS 110 is operational, and could later unlock the resource.

In step 280, NMS 110 uses the resource. Due to the potentially exclusive access, NMS 110 may perform any desired modifications of the resource (or other components of device 170). While steps 265 and 280 are merely shown as being sequential for simplicity, the keep-alive messages may be sent periodically even when the resource is being used in step 280.

In step 290, NMS 110 sends a request to unlock the resource once the use is complete. The method then ends in step 299. Thus, the approach(es) according to FIG. 2B can be used to lock a resource. The description is continued with respect to the manner in which keep-alive messages may be sent (by NMS 110) and processed (by agent 150) in example embodiments.

5. Keep-Alive Messages

Figure 3A:
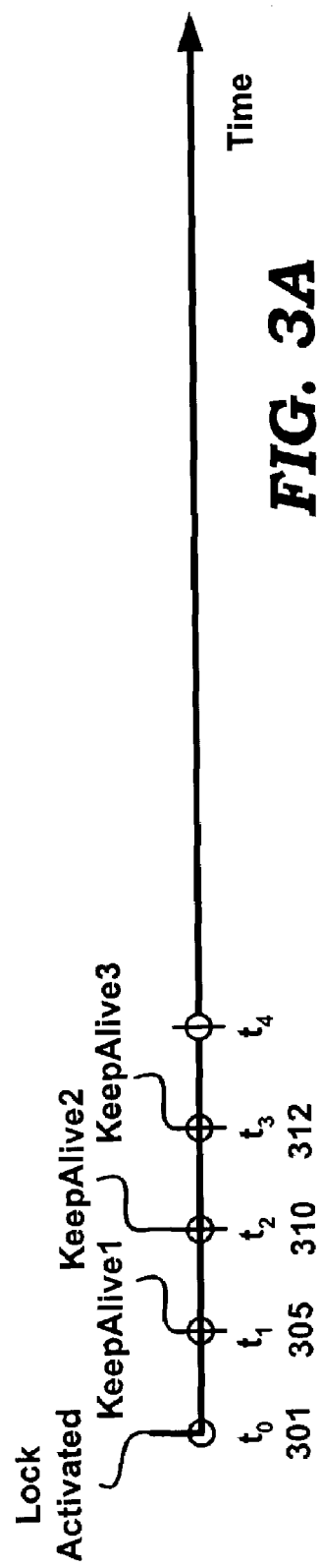
FIG. 3A is a timing diagram illustrating the manner in which keep-alive messages would be received at regular intervals under ideal circumstances.
Figure 3B:
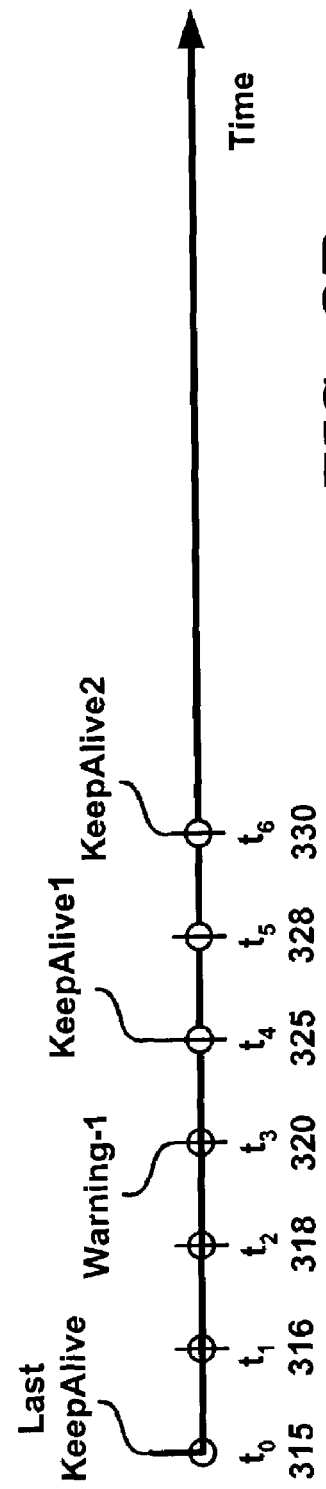
FIG. 3B is a timing diagram illustrating a scenario in which keep-alive messages are missed, but the lock is continued to be maintained as subsequence messages are timely received.
Figure 3C:
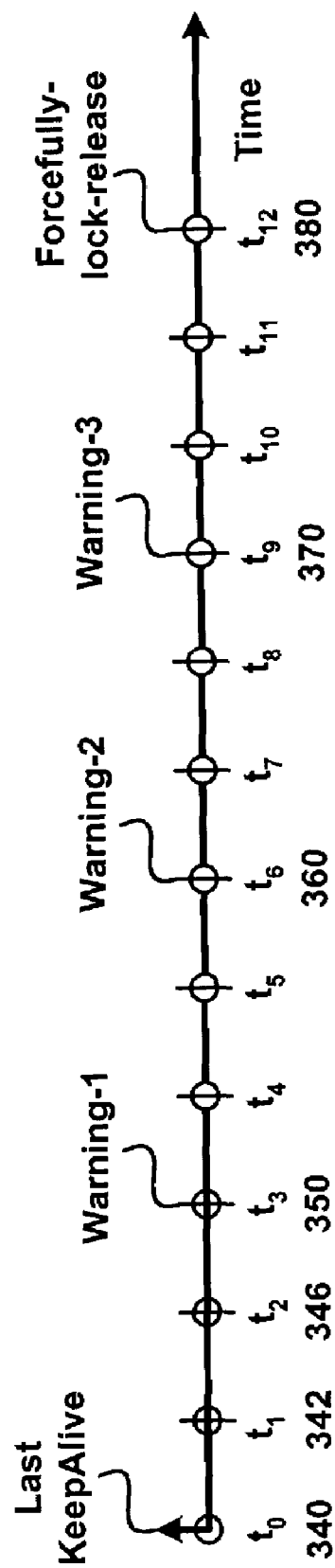
FIG. 3C is a timing diagram illustrating a scenario in which a lock is forcibly released as keep-alive messages are not received for a substantial duration.

FIGS. 3A-3C are timing diagrams illustrating various principles underlying the use of keep-alive messages in a an embodiment of the present invention. Each diagram contains time points (t1, t2, etc., on horizontal X-axis), and various activities at different time points. Each Figure is described below in further detail.

FIG. 3A represents various activities on time axis when NMS 110 is ideally operational assuming that keep-alive messages are to be received in agent 150 periodically at interval equaling the duration (period T) between two time points (e.g., 30 seconds). Thus, at 301 (time)=t0, activity is shown as 'lock activated' indicating that the agent 150 has locked a resource requested by NMS 110. After that, keep-alive messages are seen received at time points 305 (t=t1), 310 (t=t2) and 312 (t=t3), as expected.

FIG. 3B represents activities illustrating the manner in which warning messages may be generated by agent 150 when expected keep-alive messages are not received. The description is provided under the assumption that a warning message is received if a keep-alive message is not received in three consecutive periods (3×units).

Thus, a keep-alive message is shown received at 315 (t=t0), and no more messages until time point 320 (t=t3). Accordingly, a warning message (numbered one) is shown sent at time point 320. A keep-alive message is shown received at time point 325 (t=t4). The next keep-alive message is shown received at time point 330 (t=t6), but no warning messages are sent in between because three periods have not elapsed since the previous message.

In one embodiment, agent 150 forcibly unlocks a resource if a keep-alive message is not received after three consecutive warning messages. However, reception of a keep-alive message causes the corresponding warning counter to be reset to zero, and thus forcible unlocking is performed only if no keep-alive messages are received for at least 12 consecutive periods as described below with reference to FIG. 3C.

FIG. 3C depicts a scenario in which no keep-alive message are received in 12 successive time periods (t1-t12) after receiving a keep-alive message at time point 340 (t=t0). As may be observed, three warnings are shown sent at time points 350 (t=t3), 360 (t=t6) and 370 (t=t9). As no keep-alive messages are received in spite of the warnings, the lock is indicated to be forcefully released at time point 380 (t=t12).

Thus, it may be appreciated that the keep-alive messages of above provide an example approach by which agent 150 may determine whether NMS 110 is operational. It is generally preferable that NMS 110 try to send keep-alive messages with a high priority (quickly and possibly several) when warning messages are received to avoid forcible release of a lock.

The keep-alive messages and the lock/unlock requests may be communicated using various conventions as will be apparent to one skilled in the relevant arts at least by reading the disclosure provided herein. An example convention for such exchanges is described below in further detail.

6. MIB Definition

FIGS. 4A-4N together contain text representing the definition of a Management Information Base (MIB), which can be used to encode messages (requests and responses) between NMS 110 and agent 150. The MIB definition is shown spanning multiple figures merely for organization, but represents a single MIB definition. The line numbers in FIGS. 4A-4N are unique, and these figures are accordingly described with reference to line numbers below.

Broadly, the MIB defines various convention for exchange of information related to lock table (used to store data related to each lock request), local time (for time management), keep-alive exchanges, and traps (notifications). The portion of the MIB as related to each category is described below in further detail. Only some of the portions of the MIB are described for conciseness. However use and operation of the other portions will also be apparent to one skilled in the relevant arts by reading the contents of the present application.

Lines 4033-4035 (of FIG. 4A) define the object identifier for lockObject, lockNotifications and lockConformance variables as equaling values 1, 2, 3 respectively appended to the object identifier value of lockMIB. Lines 4018 through 4028 in turn identify the object identifier of lockMIB as ciscoMgmt.200. Lines 4001-4016 contains preliminary information, which will be apparent to one skilled in the relevant arts.

As is well known, an object identifier uniquely identifies a specific entity, and is generally used with various SNMP requests and responses. The object identifier for ciscoMgmt can be ascertained from known sources. Similarly, the object identifier for lockTraps variable is set in line 4670.

Lines 4040-4066 (of FIG. 4B) contain various error codes, which may be used to communicate corresponding status information. Lines 4084-4090 (of FIG. 4C) lockLocalTime (local time), which is to be specified as the local time used by the agent 150 according to one convention.

Lines 4092-4098 (of FIG. 4C) specify a convention for sending keep-alive message. As noted there, each keep alive message is to contain lockOwner, lockName or lockKey objects, and the corresponding syntax/identifier are defined in lines 4162-4168 (of FIG. 4D), 4180-4186 (of FIG. 4E), and 4470-4476 (of FIG. 4K) respectively. In general, each entry is identified by a corresponding string. By using a lock name, each lock owner (e.g., NMS 110 or an application executing thereon) may have multiple locks in a device.

Lines 4105-4111 (of FIG. 4C) specify that lockTable is a table containing multiple rows of lockEntry, the columns of which defined in lines 4139-4160 (of FIG. 4D). Some of the columns are stored in agent 150 or device 170, and some other columns are used to cause the appropriate action for a lock related to the addressed row as described below in further detail.

As may be readily observed, the table is defined to contain columns entitled—lockOwner, lockName, lockDescr, lockInterval, lockWeekDay, lockMonth, lockDay, lockHour, lockMinute, lockType, lockContextName, lockVariable, lockKey, lockMaxDuration, lockActualDuration, lockRequestTime, lockLastActiveTime, lockOperStatus, lockOper, LockKeepAliveWarningsSent, and lockRowStatus.

Some of the above columns (e.g., lockInterval, lockWeekDay, lockMonth, lockType) are defined as atomic data types (which do not require further definition and are defined by standards), and others are defined elsewhere in the MIB. The purpose of the columns (in an embodiment) is briefly described below while indicating the line numbers at which the columns are defined. For each column, the corresponding object identifier is also identified in the noted lines.

The lockOwner column indicates the owner of the lock (e.g., identifier of device and/or application). It may be appreciated that the owner of a lock may be a different entity than the requestor (NMS 110), and accordingly the lockOwner column identifies the owner of the lock.

The lockName column identifies a name (unique within the requestor entity). The combination of lockName and lockOwner may be used as an index of the table as specified in lines 4136 and 4137. Accordingly, each of the keep-alive messages may also contain the lock name and the owner (requestor).

Continuing with reference to description of the columns specified by the MIB, lockDescr (lines 4188-4195 of FIG.

4E) is merely an information string which can be used, for example, to provide an appropriate description of the (purpose of) the lock, and may be set as desired when requesting the lock. The column lockInterval (lines 4197-4205 of FIG. 4E) specifies the interval between successive locking actions in the case of periodic scheduling of locks.

The columns lockWeekDay (described in further detail in lines 4230-4245 of FIG. 4F), lockMonth (lines 4247 of FIGS. 4F through 4283 of FIG. 4G), lockDay (lines 4285-4309 of FIG. 4G), lockHour (lines 4330-4343 of FIG. 4H), lockMinute (4370-4391 of FIG. 4I) respectively provide ways to specify times at which a lock may need to be scheduled. The column lockType (lines 4393-4404 of FIG. 4I) specifies whether the lock is periodic, calendar or one-shot. Thus, an aspect of the present invention enables the locks to be scheduled periodically without sending individual request commands.

The column lockContextName (lines 4420-4426 of FIG. 4J) is used to specify the SNMP context described in further detail in RFC 2571 entitled, "An Architecture for Describing SNMP Management Frameworks". The column lockVariable (lines 4428-4435 of FIG. 4J) indicates the specific resource (e.g., using object identifier in a corresponding MIB definition) to be locked by the corresponding row.

The column lockMaxDuration (lines 4478-4486 of FIG. 4K) indicates the duration in seconds after which the lock may be automatically released. The column lockActualDuration (lines 4488-4496 of FIG. 4K) indicates the actual duration for which the lock was in a lock state. The counter (and the row for the lock) may be maintained even after unlocking a resource for information and accounting.

The column lockRequestTime (lines 4498-4505 of FIG. 4K) indicates the date and time the lock request arrived. The column lockLastActiveTime (lines 4520-4527 of FIG. 4L) indicates the date and time when the lock request was last moved to lock state. Such information may be particularly useful when locks are periodically scheduled, etc. A value of 0 is returned if a lock state has not been reached.

The column lockOperStatus (lines 4530-4544 of FIG. 4L) indicates the present status of a lock. In an embodiment, the lock status/state can be one of scheduled, conflict, locked, unlocked, canceled, and finished. A scheduled status indicates that the lock request was successful and can be used at the scheduled time. A conflict status indicates that the resource requested is not free and will be made available when the resource is free.

A locked status indicates that the lock has been allotted and the lock is active. The finished status indicates that the lock has ended (e.g., upon unlocking of a one-shot lock). The canceled state indicates that the lock request was abandoned. Resolution of conflicts between locks vying for same resource may be left to the agent's implementation.

Continuing with the definition of columns of the table, the column lockOper (lines 4545-4556 of FIG. 4L) specifies the specific operation to be performed in a present request. In one embodiment, the operation can take on one of three values representing lock, unlock and cancel. A cancel operation is generally used associated with locks scheduled for future.

The column LockKeepAliveWarningsSent (lines 4570-4576 of FIG. 4M) indicates the number of keep-alive message warnings sent from the agent. The column lockRowStatus (lines 4578-4584) of FIG. 4M is generally used for creation/deletion of rows as described in further detail in RFC 1903.

The MIB may define lockTraps (unscheduled notifications) as illustrated with examples in lines 4670-4693 of FIG. 4N. In particular, lines 4672-4679 defines a convention for sending a trap notification to the registered trap receivers when a lock entry is moved to a locked status. Lines 4681-4686 define a convention for sending a trap notification when a resource is unlocked or canceled. Lines 4688 through 4693 define a convention for sending warning messages when keep-alive messages are not received periodically.

While the MIB merely defines the type of data that is exchanged, both NMS 110 and device 170 need to be provided with the appropriate implementation to use the MIB. Several implementations will be apparent to one skilled in the relevant arts at least based on the disclosure provided herein. The description is continued with reference to example implementations of agents and requesters.

7. Device/Agent

Figure 5:
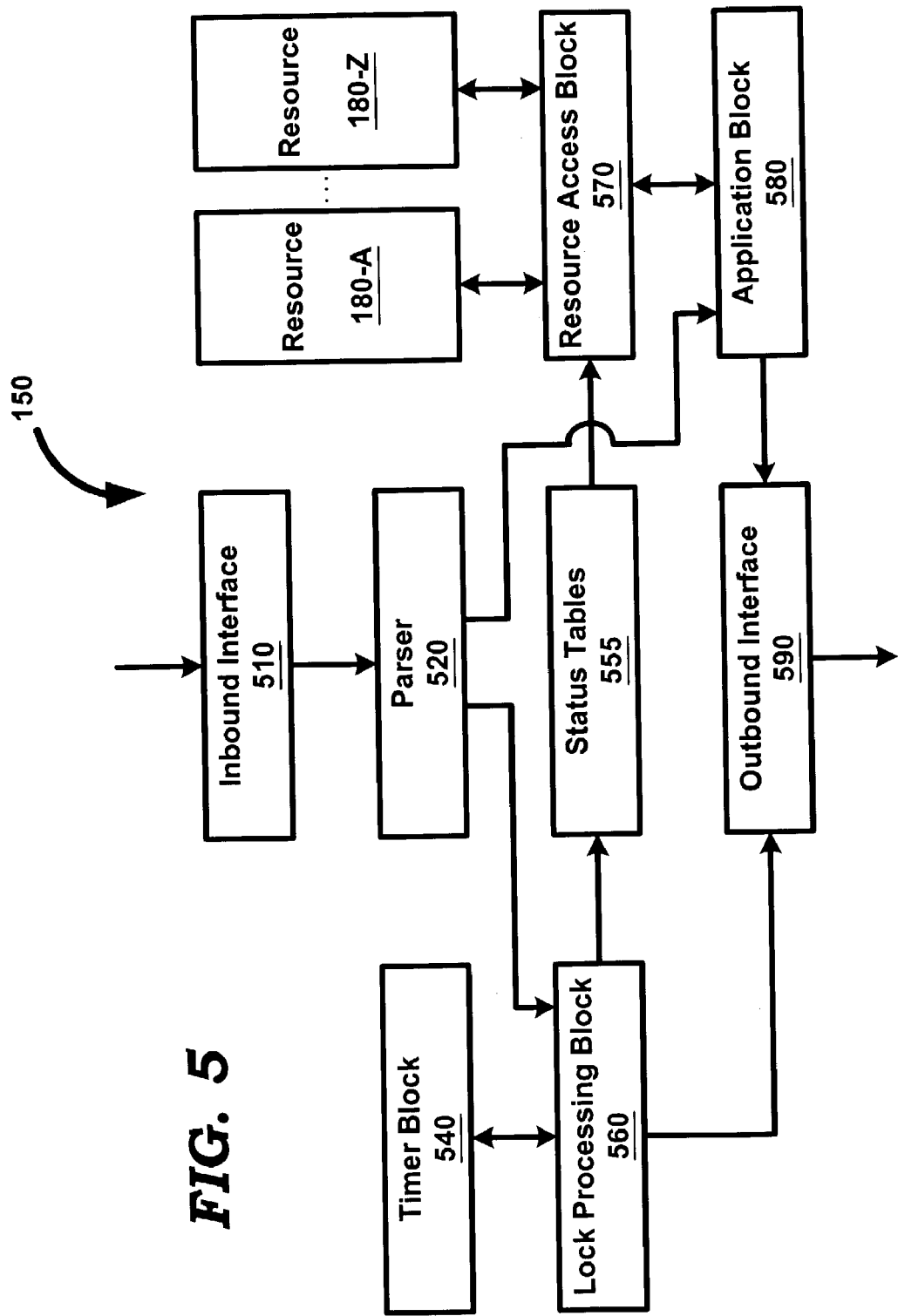
FIG. 5 is a block diagram illustrating the details of an embodiment of an agent in an embodiment of the present invention.

FIG. 5 is a block diagram illustrating the details of an embodiment in which an agent is integrated with a device in an embodiment of the present invention. The block diagram is shown containing inbound interface 510, parser 520, timer block 540, lock processing block 560, resource access block 570, application block 580, and outbound interface 590. Each block is described below in further detail.

Inbound interface 510 provides electrical, physical and protocol interface to receive data packets from network 120. Inbound interface 510 forwards the received packets to parser 520. Similarly, outbound interface 590 is provided with electrical, physical and protocol interface to send various packets on network 120. Both inbound interface 510 and outbound interface 590 may be implemented in a known way.

Parser 520 receives packets from inbound interface 510, and determines the next block to forward each packet. The packets related to implementation of locks according to various aspects of the present invention, are forwarded to lock processing block 560. Packets related to applications (for which device 170 may otherwise be designed for) may be forwarded to application block 580.

Resource access block 570 controls access to resources 180-A through 180-Z based on the lock information available in status table 555. With reference to the examples described above, if an entry is indicated as presently being locked, access to the corresponding resource is permitted only from the owner (requester) of the lock. However, other approaches such as restricting only write accesses (or permitting a group of other devices/applications to access the resource) may also be implemented depending on the specific requirements of the environment.

Application block 580 implements various applications for which device 170 is generally intended for, and may be implemented in a known way. Application block 580 may be designed to access resources (180-A through 180-Z) through resource access block 570. Timer block 540 implements various timers facilitating the implementation of forcible release of locks when keep-alive messages are not received from a requester for an extended period of time. Timer block 540 may be implemented in a known way.

Lock processing block 560 may set the entries of status table 555 based on lock/unlock requests and (absence of) reception of keep-alive messages. In an embodiment implemented in the context of SNMP, status table 555 may contain the various columns described above with reference to FIGS. 4A-4N, and the requests/messages may be received consistent with the corresponding MIB definition. In general, lock processing block 560 needs to process the set/get requests to update the lock information in status table 555. The implementation of lock processing block 560 will be apparent to one skilled in the relevant arts by reading the disclosure provided herein.

Thus, the approach(es) FIG. 5 can be used to implement agent 150 and/or device 170. However, NMS 110, agent 150 and device 170 can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing each system (or block within a system) with a desired mix of hardware, software and/or firmware. Embodiments implemented substantially in software are described below.

8. Software Implementation

Figure 6:
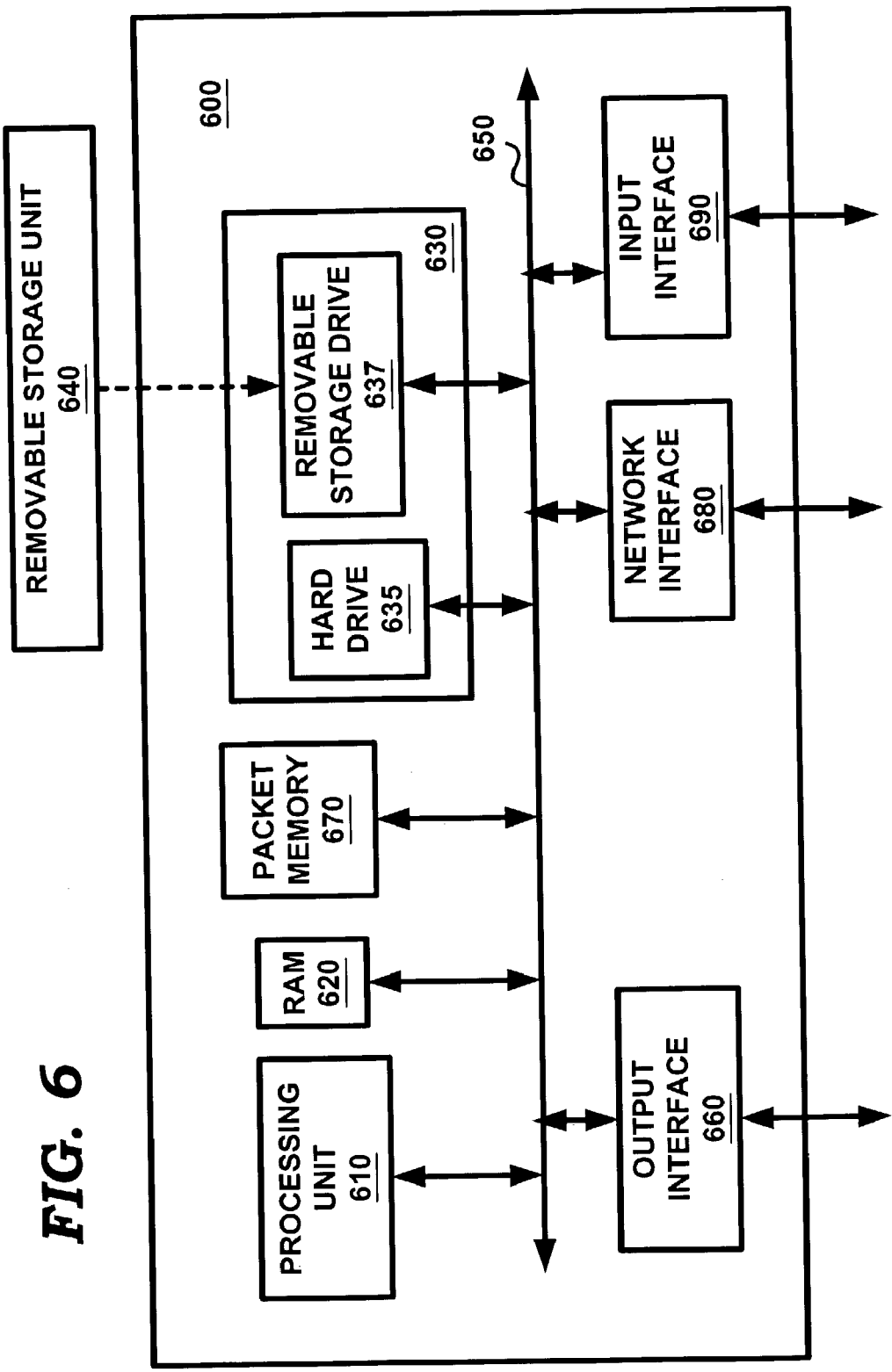
FIG. 6 is a block diagram illustrating the details of embodiments of the present invention implemented substantially in the form of software.

FIG. 6 is a block diagram illustrating the details of system 600 in one embodiment. System 600 may correspond to any one of NMS 110, agent 150, and a single system integrating both device 170 and agent 150. System 600 is shown containing processing unit 610, random access memory (RAM) 620, storage 630, output interface 660, packet memory 670, network interface 680 and input interface 690. Each block is described in further detail below.

Output interface 660 provides output signals (e.g., display signals to a display unit, not shown) which can form the basis for a suitable interface for an administrator to interact with system 600. Input interface 690 (e.g., interface with a keyboard and/or mouse, not shown) enables a user/administrator to provide any necessary inputs (e.g., examination of various status tables or manual configuration) to system 600.

Network interface 680 may enable sending/receiving of various packets containing the set and get requests using protocols such as TCP/IP. Network interface 680, output interface 660 and input interface 690 may be implemented in a known way.

RAM 620 receives instructions and data on path 650 from storage 630, and provides the instructions to processing unit 610 for execution. Secondary memory 630 may contain units such as hard drive 635 and removable storage drive 637. Secondary memory 630 may store the software instructions and data, which enable agent 150/NMS 110 to provide several features in accordance with the present invention.

While secondary memory 630 is shown contained within system 600, an alternative embodiment may be implemented with the secondary memory implemented external to system 600, and the software instructions (described below) may be provided using network interface 680.

Some or all of the data and instructions may be stored on computer readable media provided on removable storage unit 640 (or from a network using protocols such as Internet Protocol), and the data and instructions may be stored on a computer readable medium read and provided by removable storage drive 637 to processing unit 610. Examples of computer readable media include media such as EPROM, ROM, RAM, floppy disks, hard disks, magnetic tape disks, removable storage disks, USB storage device, DVDs and CD-ROMs. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for network management). The special purpose processors may also be provided instructions from RAM 620.

In general processing unit 610 reads sequences of instructions from various types of memory medium (including RAM 620, storage 630 and removable storage unit 640), and executes the instructions to provide various features of the present invention. With respect to supporting the MIB using SNMP-type implementations, NMS 10 and agent 150 need to be implemented with the corresponding supporting software instructions, and such implementations may be implemented in a known way.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of managing a resource in a network element, said method being performed in a hardware-implemented agent associated with said network element, said method comprising:

receiving on a network an explicit request to schedule a lock for a future time point on said resource in said network element, wherein an owner is associated with said lock, wherein the request is sent using a Management Information Base (MIB) protocol, and wherein a status of the lock is monitored through a plurality of keep alive messages, the status indicating if the lock is active and operational, wherein said explicit request is received containing data representing each of said future time point and said owner;

scheduling said lock associated with said owner for said future time point in response to receiving said explicit request, wherein locking said resource prevents access to said resource by entities other than said owner on said network;

wherein said resource is locked after said future time point and wherein said explicit request further specifies a maximum duration after which said lock is to be automatically released by:

continuing with said lock for said maximum duration after said future time point only if a keep-alive message is received periodically in said maximum duration, wherein said keep-alive message is designed to merely indicate that said owner is alive and operational;

performing unlocking of said resource before end of said maximum duration if said keep-alive message is not received in a specified duration period; and sending a plurality of warning messages in said specified duration period.

2. The method of claim 1, further comprising:

maintaining a table containing a plurality of rows and a plurality of columns, each of said plurality of rows containing information of a corresponding one of a plurality of locks, said plurality of locks including said lock, wherein said plurality of columns contains a column for indicating a status of said lock and columns for said future time, wherein said status is set to scheduled status to indicate that said explicit request was successful and is scheduled for said future time; and setting said status of a first row corresponding to said lock to indicate locked status in response to receiving said explicit lock request.

3. The method of claim 1, wherein said explicit lock request requests periodically locking said resource starting from said future time, and wherein said table contains columns to indicate a period at which said resource is to be locked.

4. The method of claim 1, further comprising:
receiving a cancel request associated with said lock before said future time point; and
setting a status of said lock to a canceled state in response to said cancel request, wherein said canceled state indicates that said explicit lock request has been abandoned.

5. The method of claim 4, wherein said future time point is specified based on values for one or more of a week day, month, day, hour and minute.

6. The method of claim 1, wherein said network element is one of a router, a bridge and a gateway.

7. The method of claim 1, wherein said network element is one of a router and a gateway, and said resource comprises a routing table.

8. A method of managing a resource in a network element, said method being performed in a hardware-implemented network management station, said method comprising:
sending an explicit request on a network to schedule a lock for an owner on said resource contained in said network element for a future time point,
wherein said explicit request is sent containing data representing each of said future time point and said owner, wherein the request is sent using a Management Information Base (MIB) protocol, and wherein a status of the lock is monitored through a plurality of keep alive messages, the status indicating if the lock is active and operational,
wherein said lock is designed to cause said resource to be locked exclusively for said resource at said future time point such that entities other than said owner are prevented access to said resource on said network from said future time points
wherein said resource is locked after said future time point and wherein said explicit request further specifies a maximum duration after which said lock is to be automatically released by:
sending a plurality of keep-alive messages periodically within said maximum duration after said future time point, wherein said keep-alive message is designed to merely indicate that said owner is alive and operational;
performing unlocking of said resource before end of said maximum duration if said keep-alive message is not received in a specified duration period; and
sending a plurality of warning messages in said specified duration period.

9. The method of claim 8, further comprising sending another request to cancel scheduled locking of said resource before said future time point to abandon said explicit request before said resource is locked at said future time point in response to said explicit request.

10. The method of claim 9, wherein said explicit request and said another request are sent to an agent managing said network element.

11. The method of claim 8, wherein said future time point is specified based on values for one or more of a week day, month, day, hour and minute.

12. The method of claim 8, wherein said network element is one of a router, a bridge and a gateway.

13. A computer readable medium storing one or more sequences of instructions for causing a system to manage a resource in a network element, wherein execution of said one or more sequences of instructions by one or more processors contained in said system causes said one or more processors to perform the actions of:
receiving on a network an explicit request to schedule a lock for a future time point on said resource in said network element, wherein an owner is associated with said lock, wherein the request is sent using a Management Information Base (MIB) protocol, and wherein a status of the lock is monitored through a plurality of keep alive messages, the status indicating if the lock is active and operational,
wherein said explicit request is received containing data representing each of said future time point and said owner;
scheduling said lock associated with said owner for said future time point in response to receiving said explicit request, wherein locking said resource prevents access to said resource by entities other than said owner on said network;
wherein said resource is locked after said future time point and wherein said explicit request further specifies a maximum duration after which said lock is to be automatically released by:
continuing with said lock for said maximum duration after said future time point only if a keep-alive message is received periodically, wherein said keep-alive message is designed to merely indicate that said owner is alive and operational;
performing unlocking of said resource before end of said maximum duration if said keep-alive message is not received in a specified duration period; and
sending a plurality of warning messages in said specified duration period.

14. The computer readable medium of claim 13, further comprising:
maintaining a table containing a plurality of rows and a plurality of columns, each of said plurality of rows containing information of a corresponding one of a plurality of locks, said plurality of locks including said lock, wherein said plurality of columns contains a column for indicating a status of said lock and columns for said future time, wherein said status is set to scheduled status to indicate that said explicit request was successful and is scheduled for said future time;
setting said status of a first row corresponding to said lock to indicate locked status in response to receiving said explicit lock request.

15. The computer readable medium of claim 14, wherein said explicit lock request requests periodically locking said resource starting from said future time, and wherein said table contains columns to indicate a period at which said resource is to be locked.

16. The computer readable medium of claim 13, further comprising:
receiving a cancel request associated with said lock before said future time point; and
setting a status of said lock to a canceled state in response to said cancel request, wherein said canceled state indicates that said explicit lock request has been abandoned.

17. The computer readable medium of claim 16, wherein said future time point is specified based on values for one or more of a week day, month, day, hour and minute.

18. The computer readable medium of claim 13, wherein said network element is one of a router, a bridge and a gateway.

19. A computer readable medium storing one or more sequences of instructions for causing a network management station (NMS) to manage a resource in a network element, wherein execution of said one or more sequences of instructions by one or more processors contained in said NMS causes said one or more processors to perform the actions of:

sending an explicit request on a network to schedule a lock for a future time point on said resource in said network element, wherein the request is sent using a Management Information Base (MIB) protocol, and wherein a status of the lock is monitored through a plurality of keep alive messages, the status indicating if the lock is active and operational, wherein said explicit request is sent containing data representing each of said future time point and said owner, wherein said lock is designed to cause said resource to be locked exclusively for said resource at said future time point such that entities other than said owner are prevented access to said resource on said network from said future time point;

wherein said resource is locked after said future time point and wherein said explicit request further specifies a maximum duration after which said lock is to be automatically released by:

sending a plurality of keep-alive messages periodically in said maximum duration after said future time point, wherein said keep-alive message is designed to merely indicate that said owner is alive and operational;

performing unlocking of said resource before end of said maximum duration if said keep-alive message is not received in a specified duration period; and sending a plurality of warning messages in said specified duration period.

20. The computer readable medium of claim 19, wherein said network element is one of a router, a bridge and a gateway.

21. An apparatus for managing a resource in a network element, said apparatus comprising:

a memory;

an inbound interface receiving on a network an explicit request to schedule a lock for a future time point on said resource in said network element, wherein an owner is associated with said lock, wherein the request is sent using a Management Information Base (MIB) protocol, and wherein a status of the lock is monitored through a plurality of keep alive messages, the status indicating if the lock is active and operational, wherein said explicit request is received containing data representing each of said future time point and said owner;

a lock processing block storing data in said memory indicating that said resource is scheduled to be locked for said future time point in response to receiving said explicit request;

a resource access block controlling access to said resource in said network element in response to receiving said lock, said resource access block preventing access to said resource by entities other than said owner on said network when said resource is locked;

wherein said resource is locked after said future time point and wherein said explicit request further specifies a maximum duration after which said lock is to be automatically released;

wherein said lock processing block continues said lock for said maximum duration only if a plurality of keep-alive messages are received periodically in said maximum duration after said future time point, wherein said keep-alive messages is designed to merely indicate that said owner is alive and operational;

said lock processing block unlocking said resource if a keep-alive message is not received in a specified duration period; and sending a plurality of warning messages in said specified duration period.

22. The apparatus of claim 21, wherein said memory stores a table containing a plurality of rows and a plurality of columns, each of said plurality of rows containing information of a corresponding one of a plurality of locks, said plurality of locks including said lock, wherein said plurality of columns contains a column for indicating a status of said lock and columns for said future time, wherein said status is set to scheduled status to indicate that said explicit request was successful and is scheduled for said future time, wherein said lock processing block sets said status of a first row corresponding to said lock to indicate locked status in response to receiving said explicit lock request.

23. The apparatus of claim 22, wherein said explicit lock request requests to periodically lock said resource starting from said future time, and wherein said table contains columns to indicate a period at which said resource is to be locked.

24. The apparatus of claim 21, wherein said inbound interface further receives a cancel request associated with said lock before said future time point, and said lock processing block sets a status of said lock to a canceled state in response to said cancel request, wherein said canceled state indicates that said explicit lock request has been abandoned.

25. The apparatus of claim 24, wherein said lock processing block specifies said future time point based on values for one or more of a week day, month, day, hour and minute.

26. The apparatus of claim 21, wherein said network element is one of a router, a bridge and a gateway.

27. A network management station (NMS) for managing a resource in a network element, said NMS comprising:

a network interface coupled to a network; and a processor coupled to said network interface, said processor sending an explicit request on a network to schedule a lock on said resource in said network element for a future time point, wherein said explicit request is sent containing data representing each of said future time point and said owner, wherein the request is sent using a Management Information Base (MIB) protocol, and wherein a status of the lock is monitored through a plurality of keep alive messages, the status indicating if the lock is active and operational, wherein said lock is designed to cause said resource to be locked exclusively for said resource at said future time point such that entities other than said owner are prevented access to said resource on said network from said future time point;

wherein said processor sends a plurality of keep-alive messages periodically and wherein said explicit request further specifies a maximum duration after which said lock is to be automatically released, wherein said resource is locked in said maximum duration after said future time point by:

sending a plurality of keep-alive messages periodically in said maximum duration after said future time point, wherein said keep-alive message is designed to merely indicate that said owner is alive and operational;

performing unlocking of said resource before end of said maximum duration if said keep-alive message is not received in a specified duration period; and sending a plurality of warning messages in said specified duration period.

28. The NMS of claim 27, wherein said processor sends another request to unlock said resource.

29. The NMS of claim 27, wherein said network element is one of a router, a bridge and a gateway.

30. A networked system comprising:

a network management station (NMS);

an agent; and a device designed to contain a plurality of resources to be managed via said agent, said NMS being operable to send an explicit request to said agent, said explicit request including data specifying a request for a lock on a first resource contained in said plurality of resources, said NMS as an owner of said lock, and a future time point at which said lock is to be scheduled according to a Management Information Base (MIB), said agent being operable to receive said explicit request and, in response to receipt of said explicit request to lock said first resource in said agent, to schedule said lock with said NMS as said owner on said first resource for said future time point, wherein a status of the lock is monitored through a plurality of keep alive messages, the status indicating if the lock is active and operational, said agent to lock said first resource for said NMS as said owner after said future time point such that said NMS uses said first resource exclusively after said future time point such that access is prevented to said resource by all entities other than said owner on said network in response to said explicit request;

wherein said explicit request further specifies a maximum duration after which said lock is to be automatically released with said NMS being designed to send a sequence of keep-alive messages to said agent in said maximum duration after said future time point to indicate that the owner is active and operational;

wherein said agent is designed to continue with said lock for said maximum duration after said future time point only if said keep-alive messages are received periodically in said maximum duration from said future time point;

wherein said agent unlocks said first resource before end of said maximum duration if said keep-alive messages are not received in a specified duration period, and sends a plurality of warning messages in said specified duration period.

31. The networked system of claim 30, wherein said NMS is designed to send another request to cancel scheduled locking of said resource before said future time point, wherein said agent is designed to receive said another request and to abandon said lock before said resource is locked at said future time point.

* * * * *

UNITED STATES PATENT AND TRADEMARK OFFICE
CERTIFICATE OF CORRECTION

| | | |
|---|---|---|
| PATENT NO. | : 7,739,385 B1 | Page 1 of 1 |
| APPLICATION NO. | : 10/461425 | |
| DATED | : June 15, 2010 | |
| INVENTOR(S) | : Madan Mohan Vinjamuri et al. | |

It is certified that error appears in the above-identified patent and that said Letters Patent is hereby corrected as shown below:

On Page 1, "(75) Inventors:," second line, please correct the inventor name from Bachhus S. Amarnath to read Bachhu S. Amarnath.

Signed and Sealed this

Twentieth Day of July, 2010

David J. Kappos
*Director of the United States Patent and Trademark Office*